(No Model.)
E. NEFF & A. THALMAN.
Car-Coupling.
No. 228,378. Patented June 1, 1880.
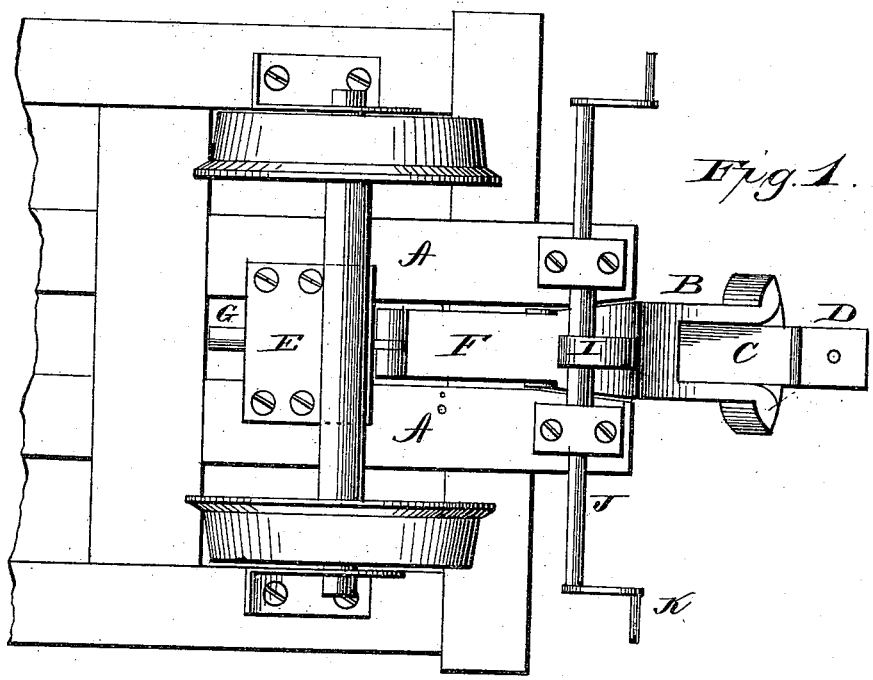
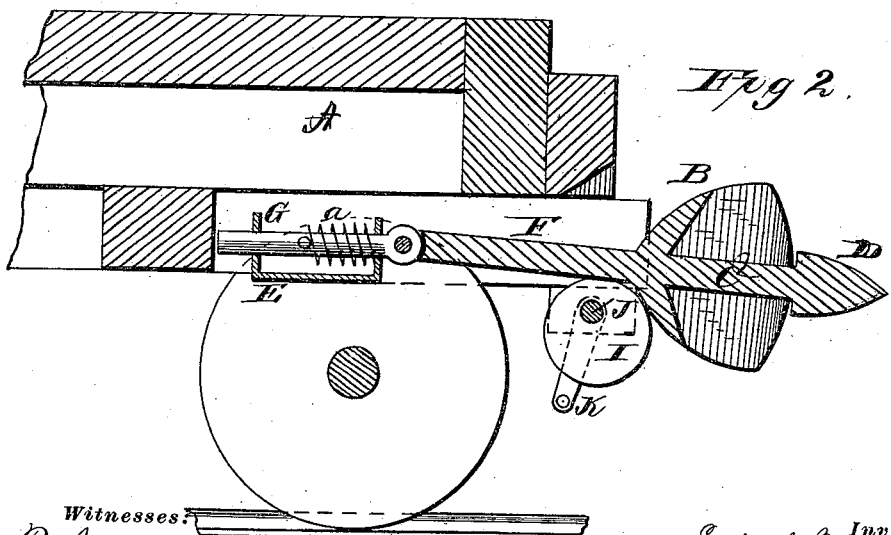

UNITED STATES PATENT OFFICE.

ELIJAH NEFF AND ANTON THALMAN, OF ROCHESTER, INDIANA.

CAR-COUPLING.

SPECIFICATION forming part of Letters Patent No. 228,378, dated June 1, 1880.

Application filed April 9, 1880. (No model.)

*To all whom it may concern:*

Be it known that we, ELIJAH NEFF and ANTON THALMAN, of Rochester, in the county of Fulton, and in the State of Indiana, have invented certain new and useful Improvements in Car-Couplings; and we do hereby declare that the following is a full, clear, and exact description thereof, reference being had to the accompanying drawings, and to the letters of reference marked thereon, making a part of this specification.

The nature of our invention consists in the construction and arrangement of a car-coupling, as will be hereinafter more fully set forth.

In order to enable others skilled in the art to which our invention appertains to make and use the same, we will now proceed to describe its construction and operation, referring to the annexed drawings, in which—

Figure 1 is a bottom view of one end of a car with our car-coupling attached thereto. Fig. 2 is a longitudinal section of the same.

A represents the bed of the car, under which is the draw-head B. This draw-head is open at top and bottom, and has a center bar, C, formed with a double hook, D, at its forward end, said hook projecting in front of the draw-head. From the draw-head projects a bar, F, a suitable distance to the rear.

The draw-head B, center bar, C, with double hook D, and the bar F may all be made in one piece; or if made in separate pieces they should be rigidly fastened together, so as to be virtually in one piece.

The rear end of the bar F is hinged or pivoted to a rod, G, which passes through a box, and has a spring, *a*, encircling the same, as shown in Fig. 2.

The draw-head is supported upon a cam or eccentric, I, secured upon a shaft, J, which runs crosswise in suitable boxes under the sills of the car.

Two cars provided with this coupling will couple, when brought together, by one of the draw-heads turning on its hinge, so that one hook will get over the other, and by said hooks being double and in the center of the draw-heads cars of unequal height may be coupled together.

The shaft J is at each end provided with a crank, K, by means of which the shaft may be turned, so as to cause the eccentric or cam I to raise the draw-head sufficient for uncoupling.

Having thus fully described our invention, what we claim as new, and desire to secure by Letters Patent, is—

The draw-head B, open at top and bottom, but closed at the sides, and provided with central bar, C, forming the double hook D, all made in one piece with the stem F, in combination with the spring-bar G, to which the stem is hinged, and the shaft J, with eccentric I, substantially as and for the purposes herein set forth.

In testimony that we claim the foregoing we have hereunto set our hands this 8th day of March, 1880.

ELIJAH NEFF.
ANTON THALMAN.

Witnesses:
   JACOB S. SLICK,
   ENOCH MYERS.